United States Patent
Miyano

(10) Patent No.: US 7,298,958 B2
(45) Date of Patent: Nov. 20, 2007

(54) MAGNETIC RECORDING/REPRODUCING APPARATUS

(75) Inventor: Tetsuo Miyano, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1205 days.

(21) Appl. No.: 10/181,476

(22) PCT Filed: Jan. 22, 2001

(86) PCT No.: PCT/JP01/00396

§ 371 (c)(1),
(2), (4) Date: Jul. 18, 2002

(87) PCT Pub. No.: WO01/58155

PCT Pub. Date: Aug. 9, 2001

(65) Prior Publication Data

US 2003/0002855 A1    Jan. 2, 2003

(30) Foreign Application Priority Data

Feb. 2, 2000    (JP)   ............................ 2000-024547

(51) Int. Cl.
*H04N 9/79*    (2006.01)
(52) U.S. Cl. ............................ 386/35; 386/8; 386/68; 386/110

(58) Field of Classification Search ................. 386/35, 386/69, 95, 110, 8, 68
See application file for complete search history.

(56) References Cited

U.S. PATENT DOCUMENTS 7,099,564 B2 *    8/2006    Higashimura et al. ........ 386/35

FOREIGN PATENT DOCUMENTS

| JP | 62-295581 | 12/1987 |
|---|---|---|
| JP | 64-54477 | 4/1989 |
| JP | 4-247786 | 9/1992 |
| JP | 8-9322 | 1/1996 |
| JP | 9-172604 | 6/1997 |
| WO | WO 01/58155 A1 | 8/2001 |

OTHER PUBLICATIONS

Navco Model 1700 System Controller Operating Instructions; Jun. 1997; MENU, CAM and SRT chapters; Appendix A, B, C, and D.*

* cited by examiner

*Primary Examiner*—John Miller
*Assistant Examiner*—James A. Fletcher
(74) *Attorney, Agent, or Firm*—Steptoe & Johnson LLP

(57) ABSTRACT

To provide a magnetic recording/reproducing apparatus capable of automatically feeding a plurality of visual images by one picture feed operation. By pressing an operation button for picture-by-picture reproduction, a tape feed controller controls a capstan motor to feed a magnetic tape by n pictures specified by a picture feed amount setting means. As a consequence, n pictures are automatically fed by one button operation, always allowing picture-by-picture reproduction only for fixed camera visual images.

1 Claim, 9 Drawing Sheets

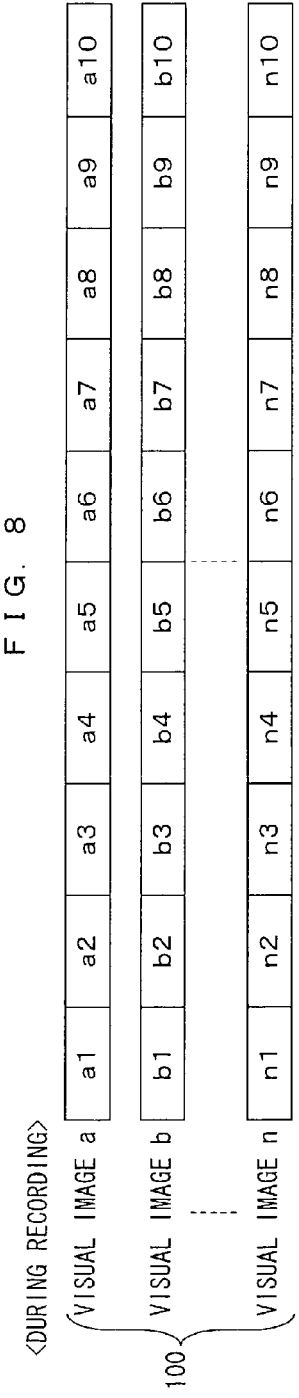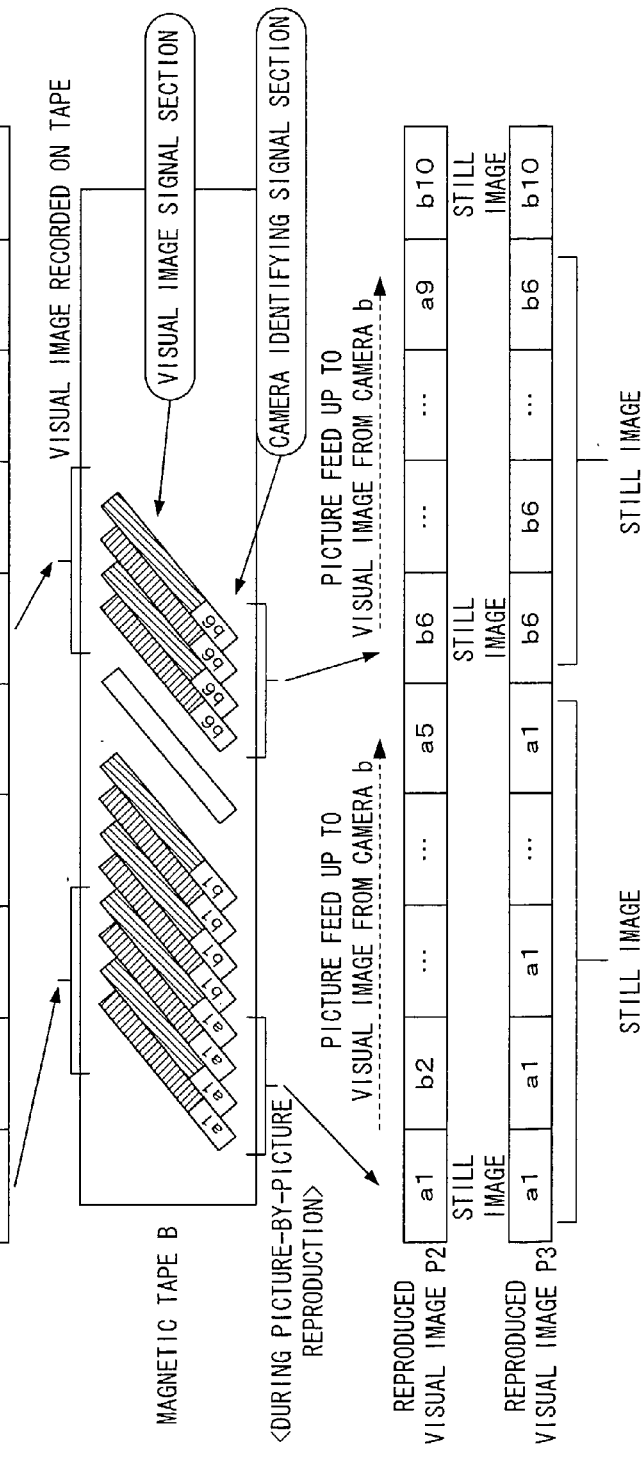
FIG. 8

MAGNETIC RECORDING/REPRODUCING APPARATUS

TECHNICAL FIELD

The present invention relates to a monitoring apparatus that can record visual images from n monitoring cameras over a long time by switching the images.

BACKGROUND ART

In the prior art, visual images from n units of cameras are switched on a picture by picture basis (in other words, a field by field basis or a frame by frame basis, because a picture is composed of a field or a frame) and recorded on magnetic tape or the like as a recording medium by a magnetic recording/reproducing apparatus over a long time.

If any event or accident happens, the magnetic tape is played back to analyze the event or accident. For this analysis, "picture-by-picture reproduction" is carried out to reproduce important scenes.

However, the conventional magnetic recording/reproducing apparatus feeds the recording medium by only one picture when a picture feed button is operated once. Accordingly, if visual images from one particular fixed camera is to be reproduced on a picture by picture basis, the picture feed button must be depressed n times in order to update an arbitrary visual image from the fixed camera because a visual image desired to be reproduced (analyzed) is recorded every n-th picture on the magnetic tape.

The present invention solves this problem. It is an object of the present invention to provide a magnetic recording/reproducing apparatus which enables a recording medium to be automatically fed by n pictures through one picture feed operation and which is internally provided with visual image storage means for enabling an arbitrary camera visual image to be reproduced even during a picture feed shift.

DISCLOSURE OF THE INVENTION

According to one aspect of the present invention, a magnetic recording/reproducing apparatus includes a visual image input means for receiving an input visual image, a visual image recording/reproducing means for recording the visual image on a recording medium, a picture feed amount setting means for setting an amount of picture feed when the recording medium performs picture-by-picture reproduction, an operation button that instructs to perform the picture-by-picture reproduction, and tape feed controller for detecting an operation of the operation button to control a capstan motor, characterized in that the tape feed controller detects the operation of the operation button to feed the recording medium by the amount of picture feed set in the picture feed amount setting means, the recording medium having visual images recorded thereon by switching the images on a picture by picture basis.

According to one aspect of the present invention, the magnetic recording/reproducing apparatus is characterized in that the visual image recording/reproducing means is provided with visual image storage means at an output thereof for sequentially storing visual images subject to picture feed stoppage so as to always output only a visual image subject to the picture feed stoppage so that only a fixed camera visual image is reproduced even during a picture feed shift.

According to another aspect of the present invention, the magnetic recording/reproducing apparatus according to is characterized in that instead of the visual image input means, the apparatus is provided with another visual image input means for receiving n input visual images and visual image switching means for switching n visual image inputs.

According to another aspect of the present invention, a magnetic recording/reproducing apparatus comprises a visual image input means for receiving an input visual image, a visual image recording/reproducing means for recording the visual image on a recording medium, the visual image recording/reproducing means receiving, during recording, visual images selected through switching operations performed by a visual image switching means and identification codes for identifying one of n units of cameras which has taken the visual images, so as to record both of the visual images and the identification codes on the recording medium, a camera number recognizing means for recognizing, during reproduction, which camera has taken the visual image, on the basis of the identification code recorded on the recording medium, a playback camera number setting means for selecting a desired camera as a reproduction target, and picture feed controller for carrying out picture-by-picture reproduction until the camera number recognizing means recognizes the identification code of the camera set in the playback camera number setting means.

According to another aspect of the present invention, the magnetic recording/reproducing apparatus according to claim 1 is characterized in that the apparatus is provided with a maximum picture feed amount setting means that performs a picture feed by the-picture feed controller until an arbitrary camera number is recognized, but stops the picture feed if the identification code of the selected camera cannot be recognized after a specified amount of pictures has been fed.

As described above, according to the present invention, the apparatus comprises a picture feed amount setting means for setting the amount of picture feed used when a recording medium performs picture-by-picture reproduction, and a tape feed controller for controlling a capstan motor by detecting an operation of the operation button which instructs to perform the picture-by-picture reproduction. The tape feed controller detects the operation of the operation button to feed the recording medium by the amount of picture feed set in the picture feed amount setting means, the recording medium having visual images recorded thereon by switching the images on a picture by picture basis. Thus, with a monitoring apparatus that records visual images from n units of cameras over a long time by switching the images, when a magnetic tape on which the visual images are recorded performs picture-by-picture reproduction, it is possible to automatically feed n pictures with a single picture feed operation.

Furthermore, the present apparatus is internally provided with a visual image storage means, thereby enabling an arbitrary camera visual image to be reproduced even during a picture feed shift.

BRIEF DESCRIPTION OF THE DRAWINGS

FIG. 8 is a timing chart for another embodiment in which one camera visual image is recorded in a plurality of tracks.

BEST MODE FOR CARRYING OUT THE INVENTION

Embodiments of the present invention will be described with reference to the drawings.

Embodiment 1

Figure 1:
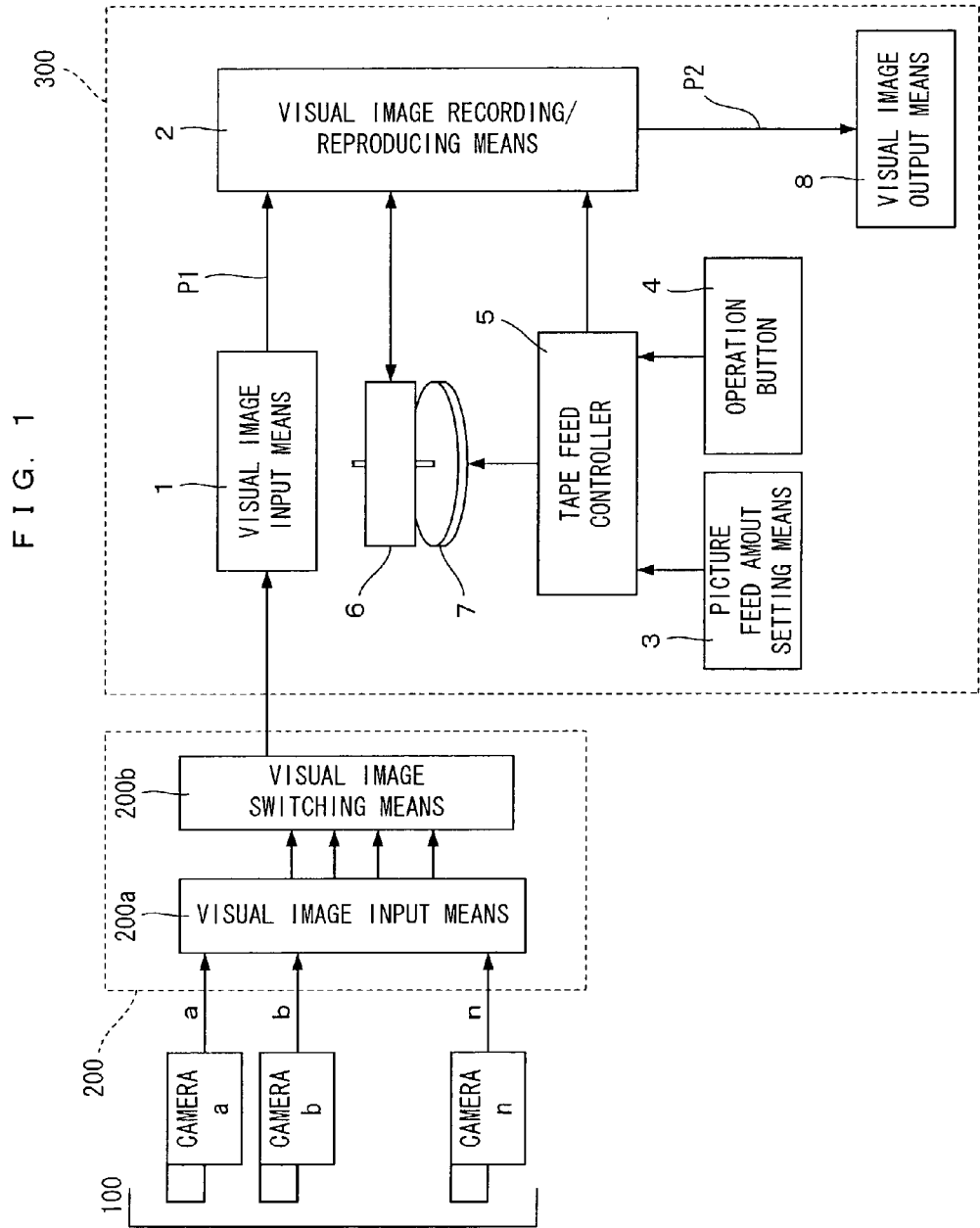
FIG. 1 is a block diagram of a magnetic recording/reproducing apparatus according to Embodiment 1.
Figure 2:
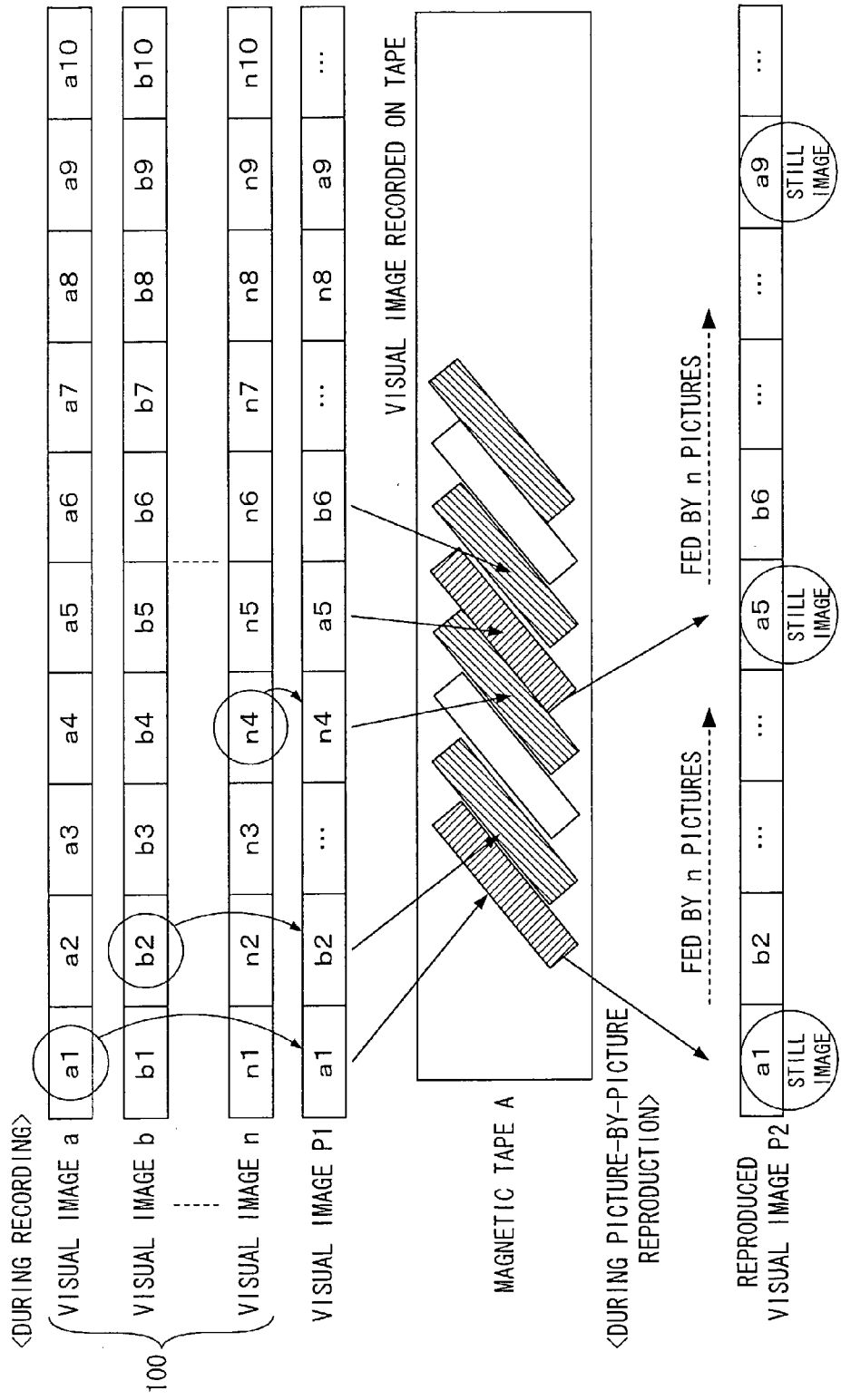
FIG. 2 is a timing chart for Embodiment 1.

FIGS. 1 and 2 show Embodiment 1.

In FIG. 1, a monitoring camera 100 is composed of n external cameras a to n. Reference numeral 200 denotes an external visual image switching apparatus that switches visual images from these cameras. In the visual image switching apparatus, a visual image input means 200a receives visual image signals from the cameras a to n, and visual image switching means 200b sequentially switches specified ones of the plurality of input visual image signals and outputs them at a predetermined period. Reference numeral 300 denotes a magnetic recording/reproducing apparatus according to Embodiment 1.

In the magnetic recording/reproducing apparatus 300, reference numeral 1 denotes a visual image input means for receiving an input visual image, that is a monitoring camera visual images, selected through a switching operation performed by the external visual image switching means 200b.

Reference numeral 2 denotes a visual-image recording/reproducing means for using a rotary head (not shown) to record a visual image signal output by the visual image input means 1 on a magnetic tape 6 or reproducing a visual image signal from the magnetic tape 6. Reference numeral 7 denotes a capstan motor that drives running of the magnetic tape 6. Reference numeral 8 denotes visual image output means for outputting a visual image reproduced by the visual image recording/reproducing means 2. Reference numeral 5 denotes tape feed controller for controlling the capstan motor 7 to feed the magnetic tape 6 by the number of pictures set by a picture feed amount setting means 3. Reference numeral 4 denotes an operation button used to feed the magnetic tape by n pictures.

FIG. 2 is a timing chart for visual image signals according to Embodiment 1.

In FIG. 2, a visual image am (m=1, 2, 3, . . . ) corresponds to a visual image signal from the camera a, a visual image bm (m=1, 2, 3, . . . ) corresponds to a visual image signal from the camera b, . . . a visual image nm (m=1, 2, 3, . . . ) corresponds to a visual image signal from the camera n.

After a switching operation by the visual image switching apparatus 200, an input to and an output from the visual image input means 1 have a visual image signal containing visual images a1, b2, . . . , n4, a5, b6, . . . , as shown in a visual image P1. A magnetic tape A has a recording format in which the visual image P1 is recorded by the magnetic recording/reproducing apparatus 300. Reference character P2 denotes a visual image reproduced during picture-by-picture reproduction. In this case, if an instruction for picture feed is given while a still image of the visual image a1 is being output by the visual image output means 8, then after the still image of the visual image a1, the visual image output means 8 outputs a still image of the visual image a5 and then a still image of the visual image a9.

A specific description will be given of the configuration of the tape feed controller 5, a picture feed amount setting means 3, and operation button 4 used to feed the magnetic tape by n pictures.

The amount of picture feed with which the magnetic tape A performs picture-by-picture reproduction is set in the picture feed amount setting means 3. In this case, visual images from the n units of cameras have been sequentially recorded on the magnetic tape through switching operations. Accordingly, if only visual images from one particular camera, that is the camera a, are to be reproduced by sequentially feeding the magnetic tape by n pictures in like manner as the visual image P2 reproduced during the picture-by-picture reproduction as shown in FIG. 2, the value of n pictures is set in the picture feed amount setting means 3.

If the still image to be reproduced is the visual image a1, when the operation button 4 is depressed in order to subject the magnetic tape A to picture-by-picture reproduction, the tape feed controller 5 controls the capstan motor 7 to feed the magnetic tape 6 by n pictures, set by the picture feed amount setting means 3.

Thus, the next still image is a visual image a5. Each time the operation button 4 is depressed, the visual image recording/reproducing means 2 provides the reproduced visual image P2 in the order of the visual image a1, visual image a5, and visual image a9. The visual image output means 8 outputs this visual image.

That is, when the magnetic tape having visual images from the n units of cameras recorded by switching the visual images on a picture by picture basis performs picture-by-picture reproduction, the magnetic tape is automatically fed by n pictures through one button operation. Consequently, only fixed camera visual images can always be reproduced by sequentially feeding the magnetic tape by specified pictures.

Embodiment 2

Figure 3:
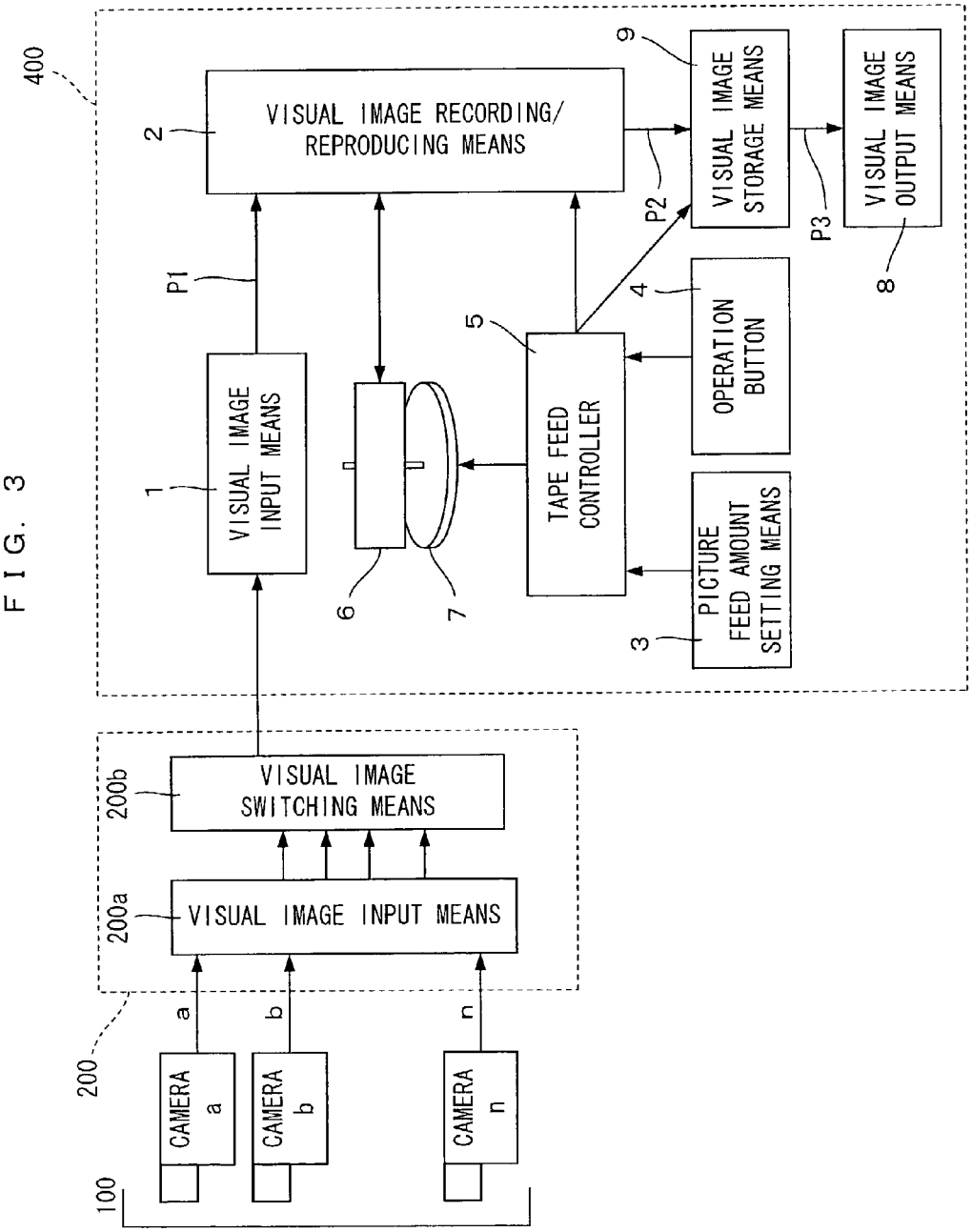
FIG. 3 is a block diagram of a magnetic recording/reproducing apparatus according to Embodiment 2.
Figure 4:
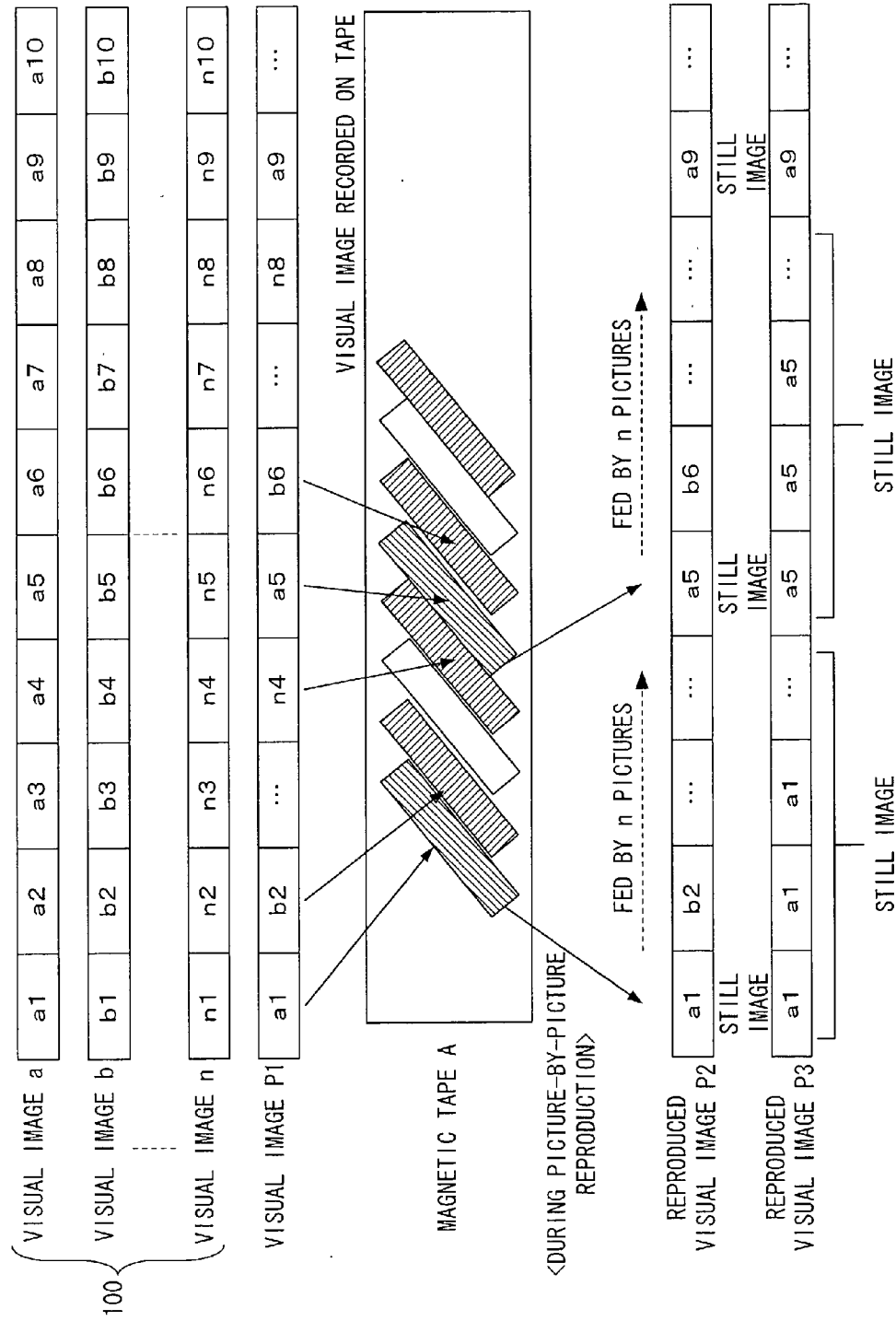
FIG. 4 is a timing chart for Embodiment 2.
Figure 5:
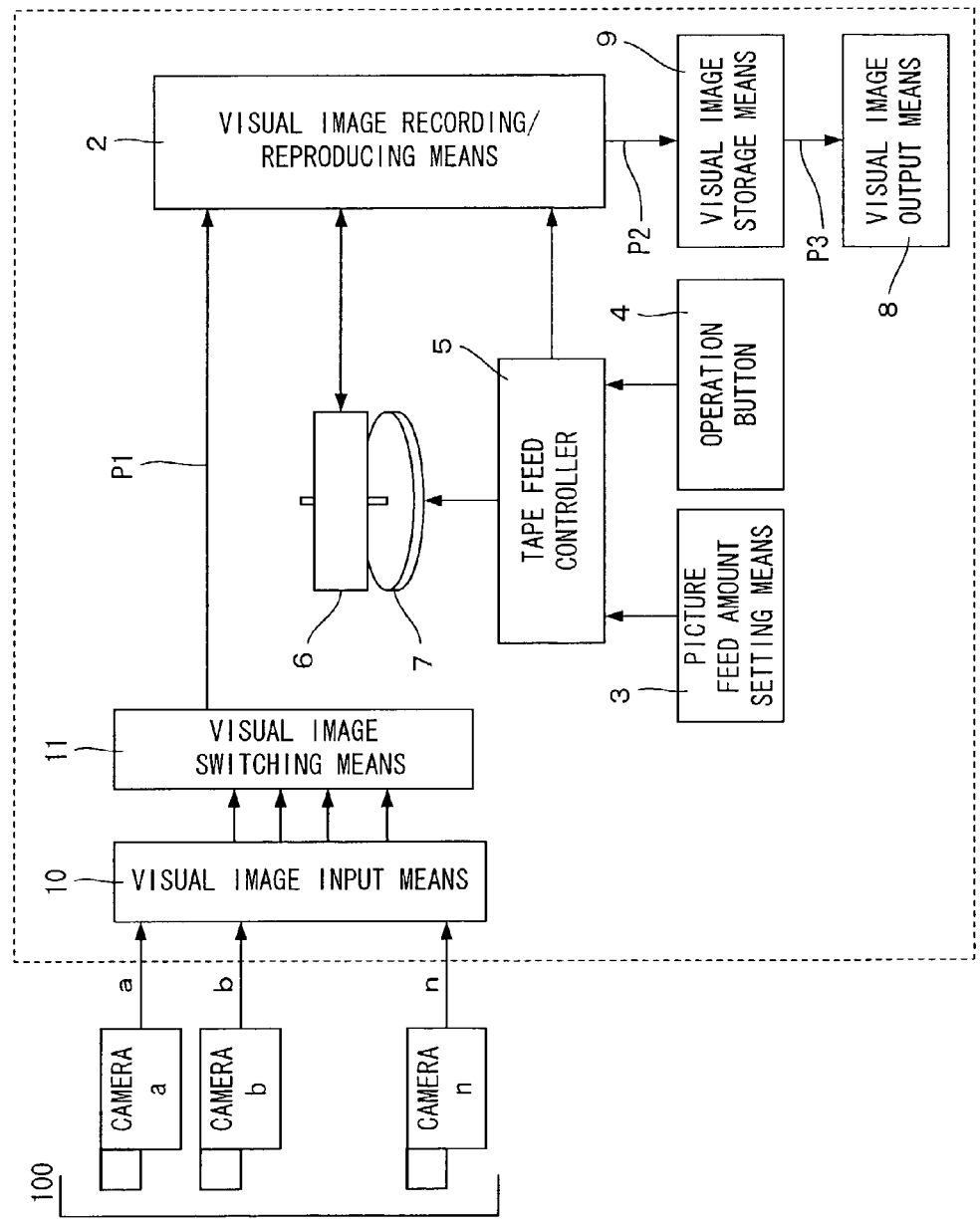
FIG. 5 is a block diagram of a magnetic recording/reproducing apparatus according to Embodiment 3.

FIGS. 3 to 5 show Embodiment 2.

A magnetic recording/reproducing apparatus 400 according to Embodiment 2 is the magnetic recording/reproducing apparatus 300 according to Embodiment 1 wherein visual image storage means 9 is provided between the visual image recording/reproducing means 2 and the visual image output means 8 so as to sequentially store visual images taken at a time of picture feed stoppage so that only a reproduced visual image P3 (see FIG. 4) taken at the time of picture feed stoppage is always output by the visual image output means 8. The other arrangements are the same as those of Embodiment 1.

In Embodiment 1, during a picture feed shift, other camera visual images are also reproduced. However, in Embodiment 2, only a fixed camera visual image can be reproduced even during a picture feed shift.

Embodiment 3

FIG. 5 shows Embodiment 3.

A magnetic recording/reproducing apparatus 500 with a visual image switching function according to Embodiment 3 contains a visual image switching device 200 instead of the visual image input means 1 according to Embodiment 2. The other arrangements are the same as those of the magnetic recording-reproducing apparatus 400.

Embodiment 4

Figure 6:
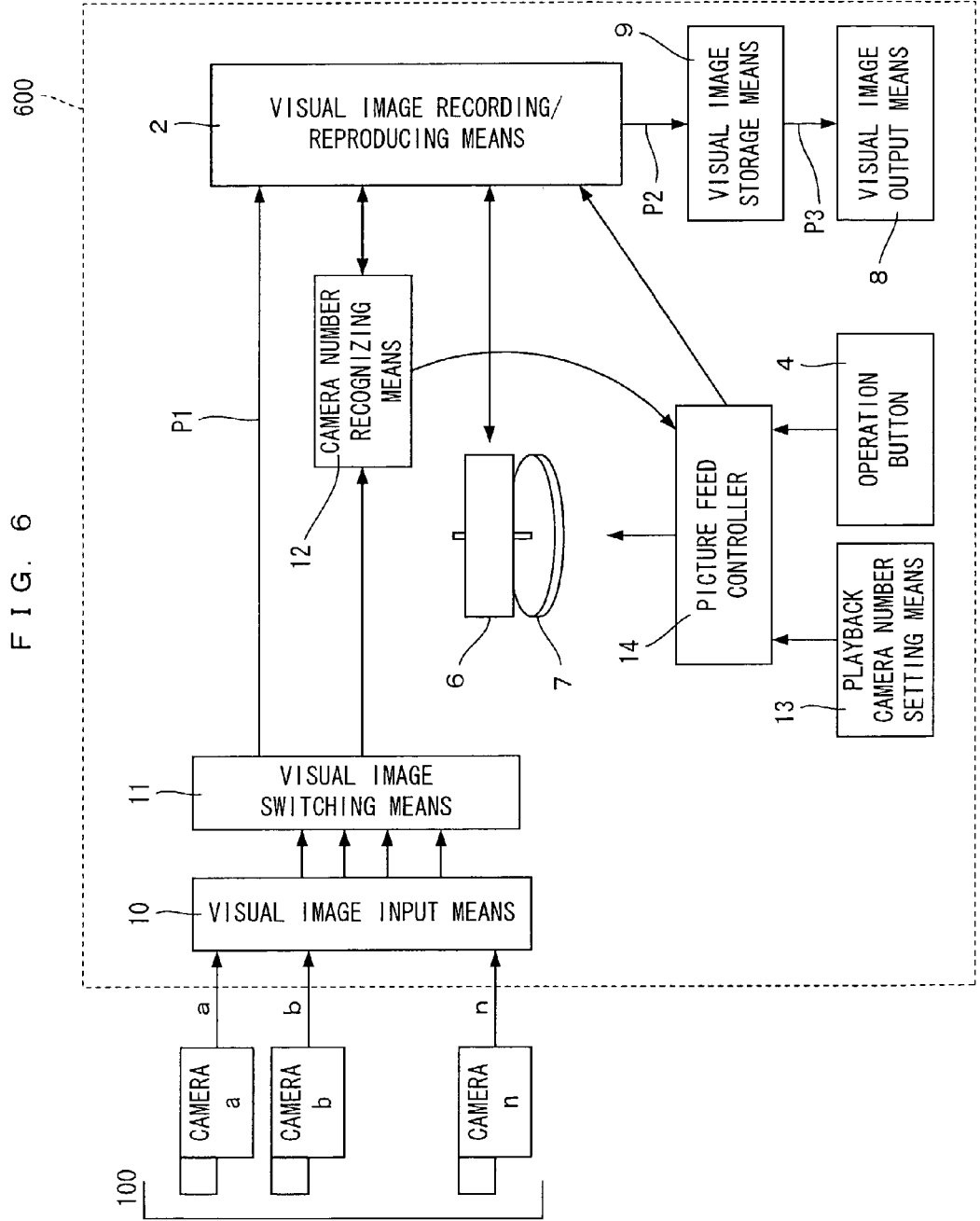
FIG. 6 is a block diagram of a magnetic recording/reproducing apparatus according to Embodiment 4.
Figure 7:
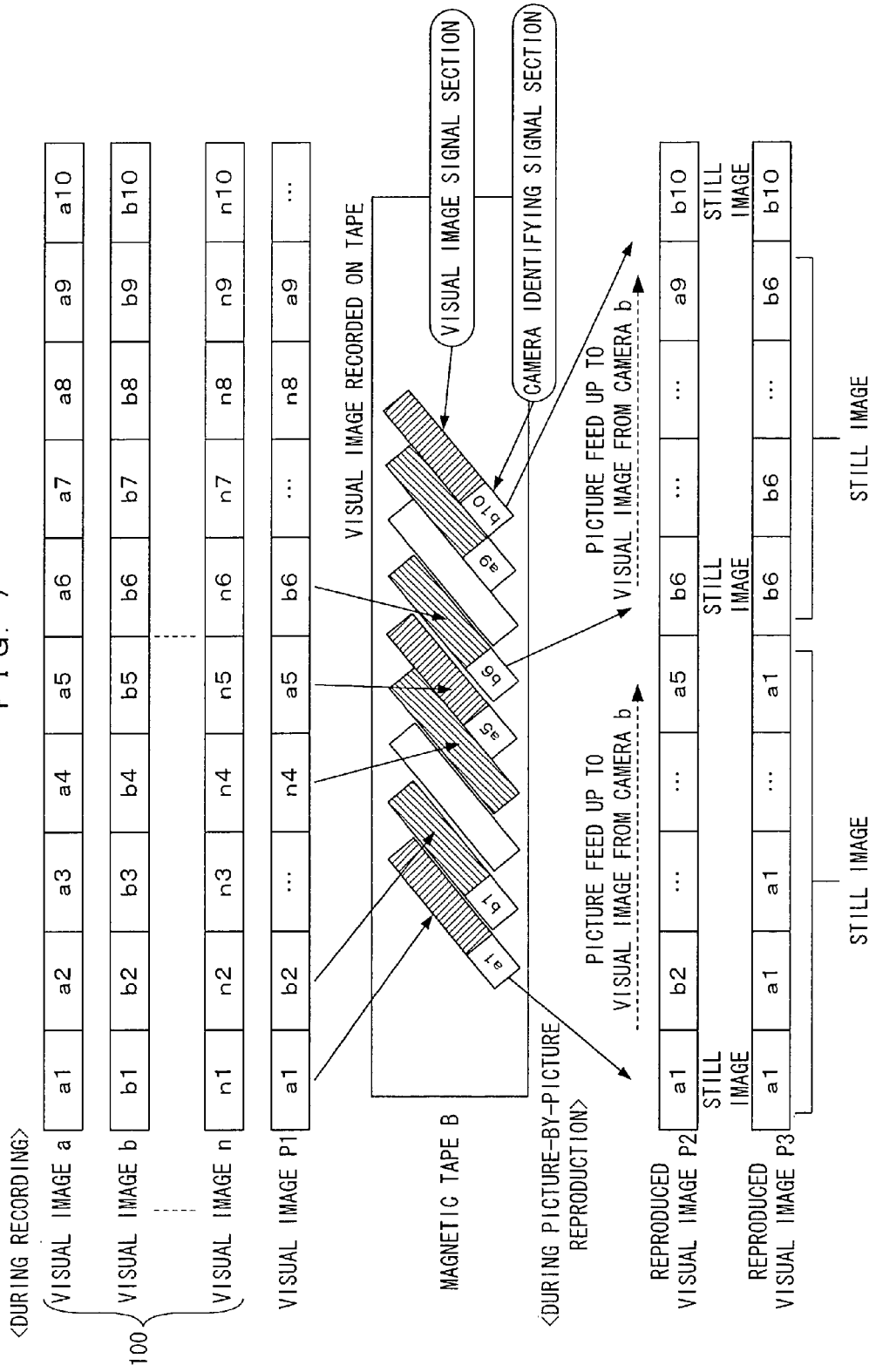
FIG. 7 is a timing chart for Embodiment 4.

FIGS. 6 and 7 show Embodiment 4.

A magnetic recording/reproducing apparatus 600 with a visual image switching function according to Embodiment 4 differs from Embodiment 3 only in that the apparatus is provided with camera number recognizing means 12 for transmitting, during recording, visual images selected through switching operations performed by the visual image switching means 11 as well as camera numbers each identifying one of the n units of cameras which has taken the corresponding visual image, to the visual image recording/reproducing means 2 and recognizing, during reproduction, the number of the camera which has provided a camera visual image recorded on the magnetic tape, playback camera number setting means 13 for selecting an arbitrary desired camera number as a reproduction target, and picture feed controller 14 for carrying out picture-by-picture reproduction until the selected arbitrary camera number is recognized, the picture feed controller 14 replacing the picture feed amount setting means 3 and tape feed controller 5 of Embodiment 3.

With this configuration, an arbitrary camera number is selected for picture-by-picture reproduction by one button operation without any need to set the amount of picture feed.

In FIG. 7, a visual image am (m=1, 2, 3, ...) is from the camera a, a visual image bm (m=1, 2, 3, ...) is from the camera b, a visual image nm (m=1, 2, 3, ...) is from the camera n, and a visual image c has been selected by the visual image switching means 11 through a switching operation. A magnetic tape B has visual images P1 and camera numbers recorded thereon. The reproduced visual image P2 is a visual image reproduced by the visual image recording/reproducing means 2 during picture-by-picture reproduction and the reproduced visual image P3 is a visual image output by the visual image storage means 9.

The operation of the magnetic recording/reproducing apparatus with the visual image switching function according to this embodiment, constructed as described above, will be described with reference to FIGS. 6 and 7.

First, visual images a, b, and n from the external monitoring camera 100 are input to the visual image input means 10. Visual images are selected as visual images P1 through switching operations performed by the visual image switching means 11. The visual images P1 are transmitted to the visual image recording/reproducing means 2. At the same time, camera numbers are transmitted from the camera number recognizing means 12 to the visual image recording/reproducing means 2 in synchronism with the visual images P1. The visual images P1 and the camera numbers are recorded on the magnetic tape 6. The magnetic tape B in FIG. 7 shows how these visual images and camera numbers are recorded on the magnetic tape.

Then, a desired-camera number is set in the playback camera number setting means 13. Here, it is assumed that the camera b is selected. Then, even if the current still image is a visual image a1, when the operation button 4 is depressed in order to subject the magnetic tape B to picture-by-picture reproduction, the picture feed controller 14 controls the capstan motor 7 to feed the magnetic tape B until information on the visual image b set in the playback camera number setting means 13 is transmitted from the camera number recognizing means 12.

Thus, the next still image is a visual image b6. The visual image recording/reproducing means 2 provides the reproduced visual image P2. Each time the operation button 4 is depressed, the visual image output means 8 provides reproduced visual images f from the camera b in the order of, for example, the visual image a1, visual image b6, and visual image b10.

That is, when the magnetic tape having visual images from the n units of cameras recorded by switching the visual images on a picture by picture basis performs picture-by-picture reproduction, the magnetic tape is automatically fed by n pictures through one button operation. Consequently, only fixed camera visual images can always be reproduced by sequentially feeding the magnetic tape by specified pictures.

In this case, the picture feed controller performs a picture feed operation until an arbitrary camera number is recognized. A maximum-picture feed amount setting means may be provided which stops a picture feed operation if the camera number cannot be recognized even after the magnetic tape has been fed by a specified amount. Then, even if a camera number that has not been recorded is mistakenly set in the playback camera number setting means 13, the picture feed operation can be automatically stopped instead of being continued.

Figure 9:
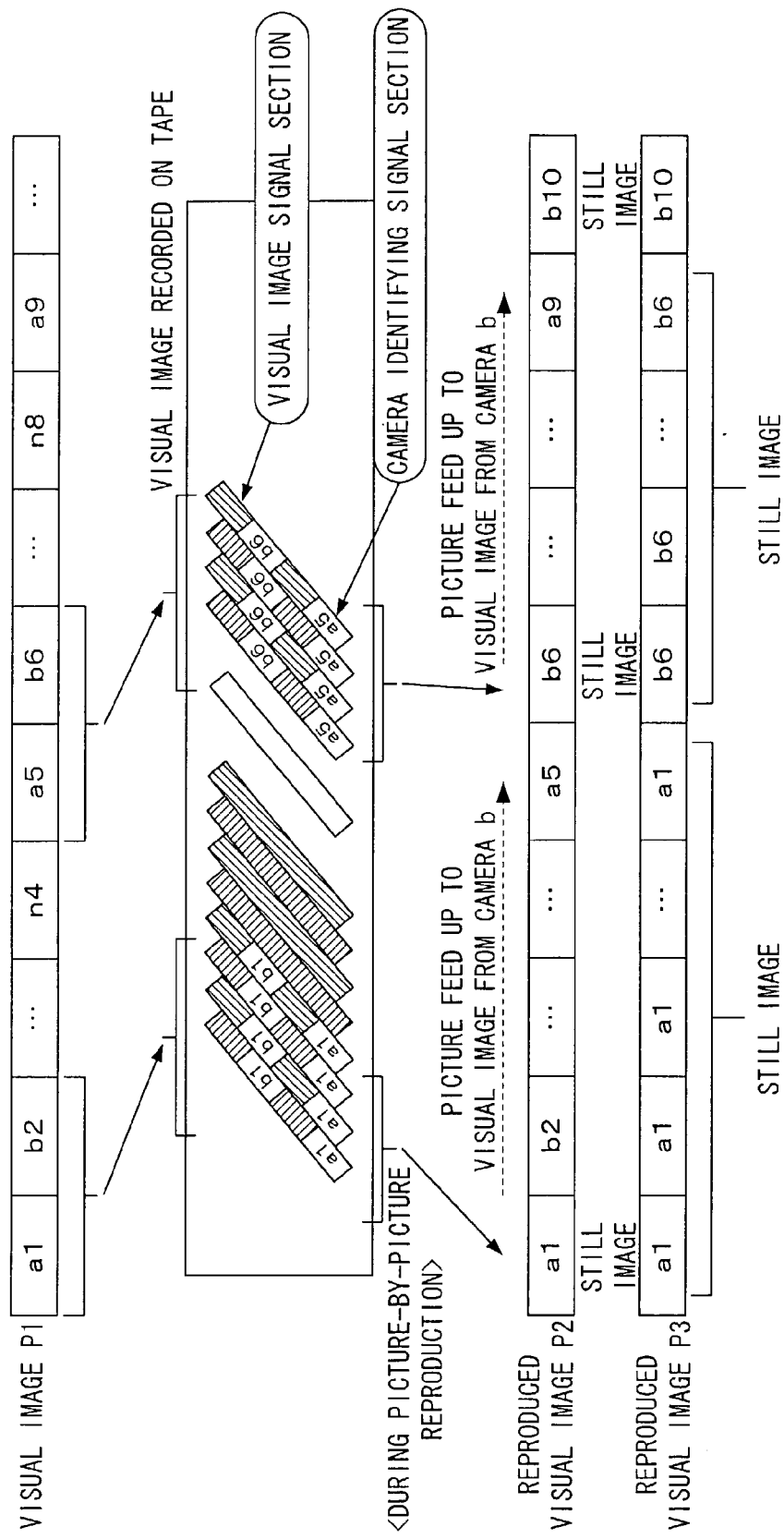
FIG. 9 is a timing chart for another embodiment in which two camera visual images are synthesized together and recorded in a plurality of tracks.

In the above embodiments, one camera visual image (a visual image composed of one field or one frame) recorded on the magnetic tape is represented by one track. However, similar effects are produced by recording one camera visual image in a plurality of tracks as shown in FIG. 8 or by synthesizing two camera visual images together and recording the synthesized visual image in a plurality of tracks as shown in FIG. 9.

The invention claimed is:

1. A magnetic recording/reproducing apparatus comprising:
   a visual image input means for receiving an input visual image;
   a visual image recording/reproducing means for recording the visual image on a recording medium;
   said visual image recording/reproducing means receiving, during recording, a visual image selected through a switching operation performed by a visual image switching means and an identification code for identifying one of n units of cameras which has taken said visual image, so as to record both of the visual image and the identification code on the recording medium,
   a camera number recognizing means for recognizing, during reproduction, which one of the cameras has taken the visual image, on the basis of the identification code recorded on the recording medium;
   a playback camera number setting means for selecting a desired camera as a reproduction target;
   a picture feed controller for carrying out picture-by-picture reproduction until the camera number recognizing means recognizes the identification code of the camera set in the playback camera number setting means, and
   a maximum picture feed amount setting means that permits a picture feed by the picture feed controller until an arbitrary camera number is recognized, but stops the picture feed if the identification code of the selected camera cannot be recognized after a specified amount of pictures has been fed.

* * * * *